(12) United States Patent
Kono

(10) Patent No.: US 8,975,847 B2
(45) Date of Patent: Mar. 10, 2015

(54) POWER CONVERSION DEVICE

(75) Inventor: Masaki Kono, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 279 days.

(21) Appl. No.: 13/522,176

(22) PCT Filed: Mar. 26, 2010

(86) PCT No.: PCT/JP2010/055353
§ 371 (c)(1),
(2), (4) Date: Jul. 13, 2012

(87) PCT Pub. No.: WO2011/118019
PCT Pub. Date: Sep. 29, 2011

(65) Prior Publication Data
US 2013/0043812 A1  Feb. 21, 2013

(51) Int. Cl.
*H02P 27/00* (2006.01)
*H02M 1/36* (2007.01)
(Continued)

(52) U.S. Cl.
CPC .......... *H02M 1/36* (2013.01); *H02M 2001/008* (2013.01); *H02M 7/48* (2013.01)
USPC ... 318/400.3; 318/803; 318/801; 318/400.17; 318/400.26; 318/5; 180/65.285; 180/65.275; 180/65.29; 320/109; 320/104; 363/123; 363/41; 363/45; 363/74; 363/132

(58) Field of Classification Search
USPC ........ 318/400.3, 51, 53, 400.07, 400.09, 139, 318/140, 801, 803, 3, 432, 112, 34, 376; 324/207.25; 180/65.265, 65.1, 65.285, 180/65.29, 65.275, 65.21; 363/123, 41, 45, 363/74, 132, 34, 39; 320/109, 104
See application file for complete search history.

(56) References Cited

U.S. PATENT DOCUMENTS

| 2009/0090574 A1* | 4/2009 | Kuno ........................ 180/65.265 |
| 2009/0195197 A1* | 8/2009 | Nishimura et al. ...... 318/400.09 |
| 2011/0140642 A1* | 6/2011 | Kono et al. .................... 318/139 |

FOREIGN PATENT DOCUMENTS

| JP | 11-252706 A | 9/1999 |
| JP | 2000-308388 A | 11/2000 |

(Continued)

OTHER PUBLICATIONS

International Search Report (PCT/ISA/210) issued on Jun. 8, 2010, by the Japanese Patent Office as the International Searching Authority for International Application No. PCT/JP2010/055353.
(Continued)

*Primary Examiner* — Kawing Chan
*Assistant Examiner* — Jorge L Carrasquillo
(74) *Attorney, Agent, or Firm* — Buchanan Ingersoll & Rooney PC

(57) ABSTRACT

A power conversion device includes a first capacitor connected in parallel to a direct-current power supply, plural power converters that drive plural synchronous machines, a second capacitor connected in parallel to a direct-current side of power converters, a switching circuit inserted between the first and second capacitors, a switch-start instruction unit that controls starting of an operation of the power converters, and a control unit that controls the power converters based on a motor velocity and a voltage of the first capacitor. The switch-start instruction unit turns off the switching circuit while the power converters stop, turns off the switching circuit until a terminal voltage of each of the synchronous machines becomes equal to a predetermined value when each of the power converters starts operating, and turns on the switching circuit when the terminal voltage of each synchronous machine becomes equal to or smaller than the predetermined value.

5 Claims, 7 Drawing Sheets

(51) Int. Cl.
*H02M 1/00* (2006.01)
*H02M 7/48* (2006.01)

(56) References Cited

FOREIGN PATENT DOCUMENTS

| JP | 2005-253264 A | | 9/2005 |
|---|---|---|---|
| JP | 2008-86077 A | | 4/2008 |
| JP | 2008086077 A | * | 4/2008 |

OTHER PUBLICATIONS

*Written Opinion (PCT/ISA/237) issued on Jun. 8, 2010, by the Japanese Patent Office as the International Searching Authority for International Application No. PCT/JP2010/055353.

* cited by examiner

POWER CONVERSION DEVICE

FIELD

The present invention relates to a power conversion device that drives a plurality of synchronous machines used in an electric vehicle such as a railway vehicle or an electric car, and more particularly to a power conversion device that can handle a case where a no-load induction voltage during high-speed rotation of synchronous machines is higher than a direct-current power supply voltage.

BACKGROUND

An operation mode of a car or a train is characterized such that the car or train runs (coasts) by inertia without accelerating and decelerating by a driving system. In a driving system that uses synchronous machines, in a case of such coasting, a no-load induction voltage is generated, this no-load induction voltage is subjected to full-wave rectification via diodes anti-parallel connected to switching elements that constitute a power converter, and a direct-current voltage (a voltage between terminals of a capacitor) rises. Therefore, electric power that has been full-wave rectified is regenerated to a power supply side, and the driving system performs a brake operation as a whole.

As means for avoiding such a brake operation, a power conversion device disclosed in Patent Literature 1 mentioned below is configured as follows. That is, in the power conversion device, a parallel connection circuit that includes a one-way conduction unit and a switching unit is inserted in series between the power supply of an inverter and an inverter arm. The switching unit is released while the inverter stops, and an excitation current is controlled so that the terminal voltage of a synchronous machine is equal to a predetermined value by releasing the switching unit when the inverter starts operating. When the terminal voltage of the synchronous machine reaches the predetermined value, the power conversion device controls a torque current of the synchronous machine in a state of closing the switching unit to cause the synchronous machine to perform an acceleration and deceleration operation. Furthermore, to control the inverter to stop operating, the power conversion device reduces the torque current to zero while controlling the excitation current so that the terminal voltage of the synchronous machine is equal to the predetermined value, and then releases the switching unit and reduces the excitation current to control the inverter to stop operating.

Furthermore, Patent Literature 2 mentioned below discloses a main circuit configuration related to a power conversion device that drives a plurality of synchronous machines.

CITATION LIST

Patent Literatures

Patent Literature 1: Japanese Patent Application Laid-open No. 2000-308388 (Claim 1, FIG. 1)
Patent Literature 2: Japanese Patent Application Laid-open No. 2008-086077 ([0093], FIG. 14)

SUMMARY

Technical Problem

The conventional technology disclosed in Patent Literature 1 mentioned above is configured to connect the parallel connection circuit that includes the one-way conduction unit and the switching unit in series between the power supply of the inverter and the inverter arm. However, because of the use of the switching unit, the conventional technology has a problem that the size of the power conversion device is made larger. Particularly, when the power conversion device is adopted in an electric vehicle, the electric vehicle is normally driven by the use of a plurality of synchronous machines. Therefore, to drive a plurality of synchronous machines, power converters as many as the synchronous machines are necessary. To realize the power conversion device that can drive the synchronous machines and that the size is made as small as possible, there is a problem that the switching unit described above prevents the power conversion device from being downsized. Furthermore, it is necessary to consider arranging a capacitor to be connected near the power converters in proportion to the plural synchronous machines. This increases the size of the capacitor, which makes it difficult to realize further downsizing and light weigh of the power conversion device. Furthermore, Patent Literature 1 does not disclose any configuration for driving a plurality of synchronous machines.

Meanwhile, Patent Literature 2 mentioned above discloses the main circuit configuration for driving a plurality of synchronous machines. However, when the synchronous machines are driven in a region in which no-load induction voltages generated from the synchronous machines are higher than a direct-current (DC) voltage (corresponding to a voltage on both ends of the DC power supply) in this main circuit configuration, the no-load induction voltages are full-wave rectified via the diodes anti-parallel connected to the switching elements that constitute the power converters. Therefore, the DC voltage rises, so that the full-wave rectified power is regenerated toward a DC power supply side, and this results in the generation of the brake operation described above. Furthermore, when the synchronous machines differ in rotational frequency, the no-load induction voltages generated by the respective synchronous machines differ in magnitude. Therefore, the brake operation described above occurs unless a necessary control is executed in view of the magnitudes of the no-load induction voltages. Patent Literature 2 mentioned above does not disclose any control executed when the no-load induction voltages differ in magnitude, so that there is a problem that the brake operation occurs.

The present invention has been achieved in view of the above problems, and an object of the present invention is to provide a power conversion device that can suppress a brake operation caused by no-load induction voltages generated by a plurality of synchronous machines.

Solution to Problem

In order to solve above-mentioned problems and achieve the object of the present invention, there is provided a power conversion device comprising: a first capacitor connected in parallel to a direct-current power supply that supplies power to a plurality of synchronous machines; a plurality of power converters that drive each of the synchronous machines; a second capacitor connected in parallel to a direct-current side of the power converters; a switching circuit connected in series between the first capacitor and the second capacitor; a first control unit that controls operations of each of the power converters and the switching circuit based on an operation command, voltage information detected in the second capacitor, and current information detected in each of the synchronous machines; and a second control unit that controls each of the power converters based on the voltage information, motor velocity information detected in each of the synchronous machines, and a control signal from the first control unit, wherein the first control unit controls the switching circuit to be turned off while each of the power converters stops, outputs a signal for starting an operation of each of the power converters when the operation command is turned on, and controls the switching circuit to be turned on when a value of the voltage information has become equal to or smaller than a predetermined value.

Advantageous Effects of Invention

According to the present invention, there is provided the switch-start instruction unit that controls starting of an operation of a plurality of power converters, and thus it is possible to suppress a brake operation caused by no-load induction voltages of a plurality of synchronous machines.

DESCRIPTION OF EMBODIMENTS

Exemplary embodiments of a power conversion device according to the present invention will be explained below in detail with reference to the accompanying drawings. The present invention is not limited to the embodiments.

First Embodiment

Figure 1:
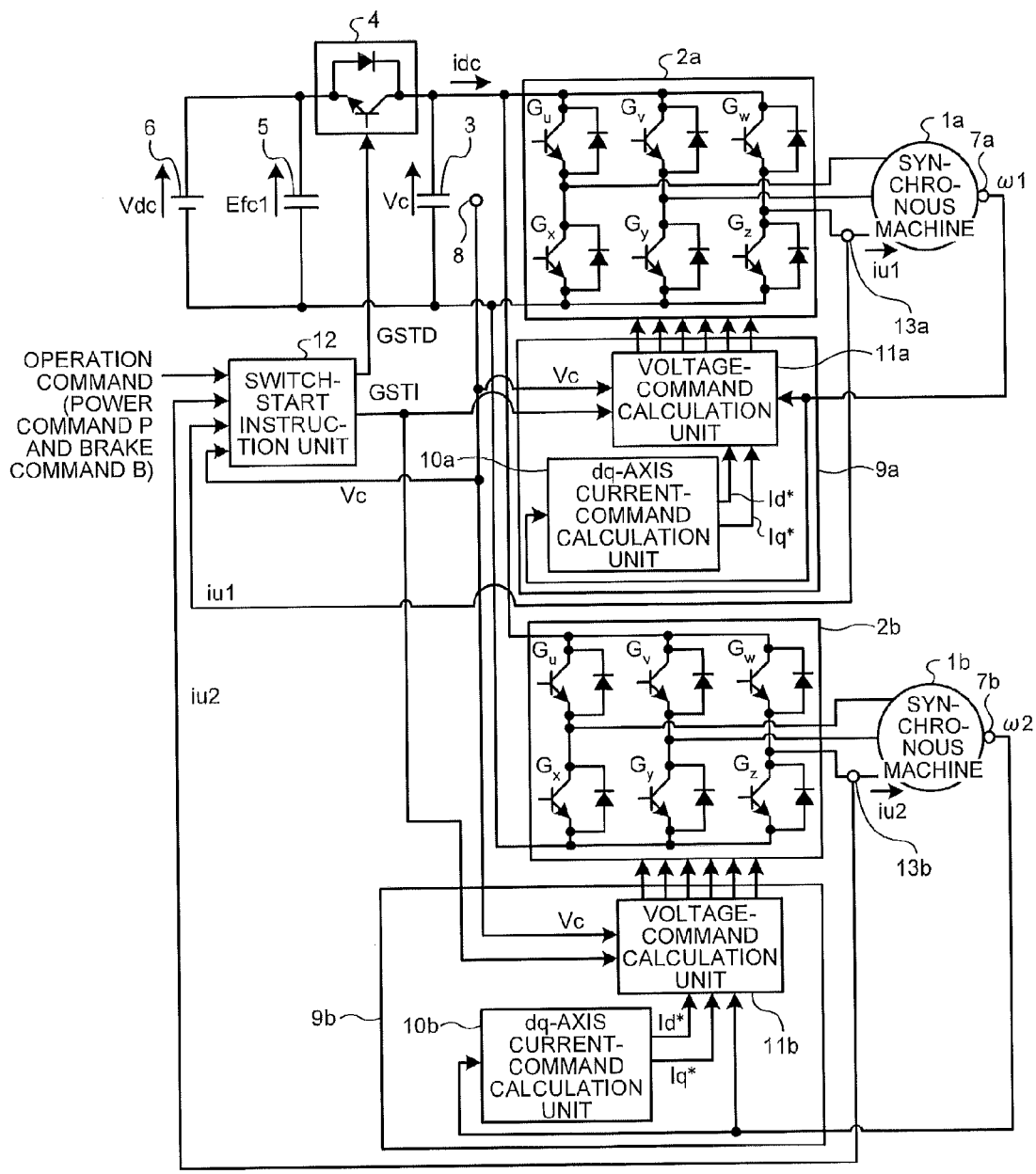
FIG. 1 is a configuration diagram of a power conversion device according to a first embodiment of the present invention.
Figure 2:
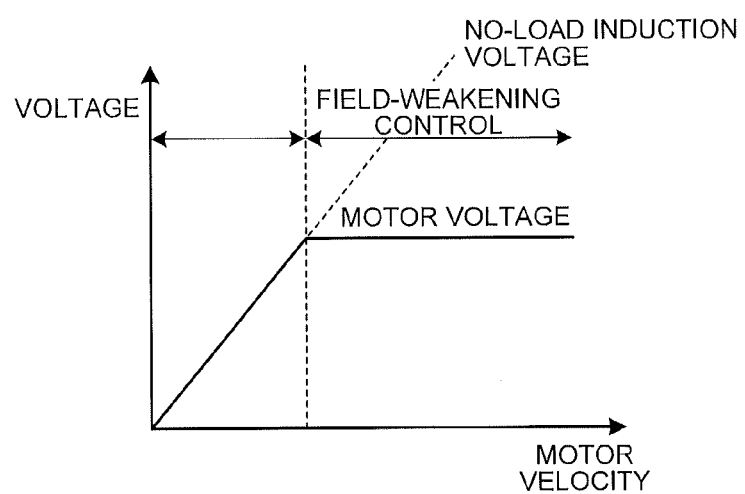
FIG. 2 depicts a relation between a motor voltage of a synchronous machine and a no-load induction voltage.
Figure 3:
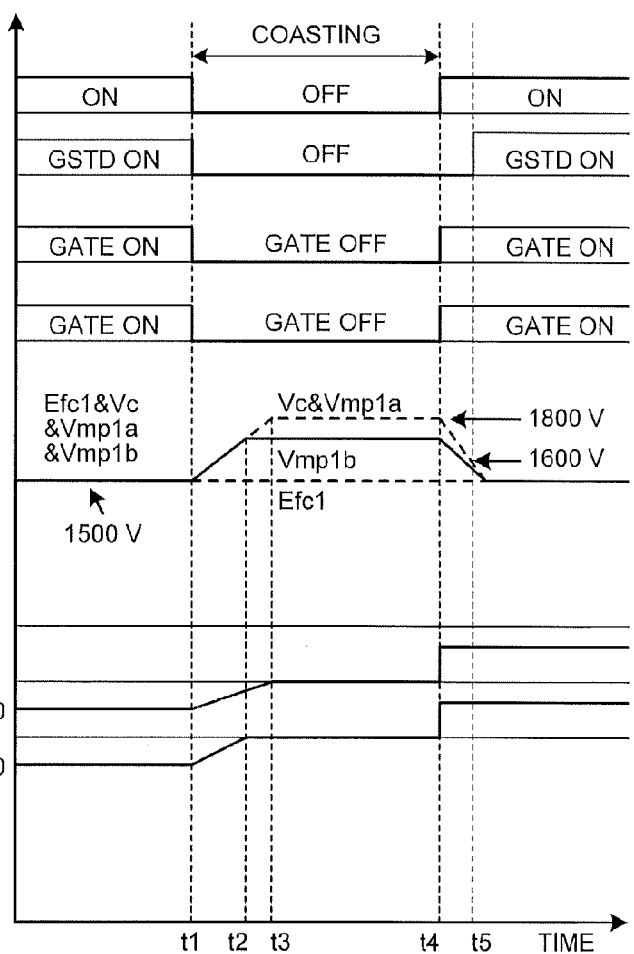
FIG. 3 is an explanatory diagram of an operation performed by the power conversion device shown in FIG. 1.
Figure 4:
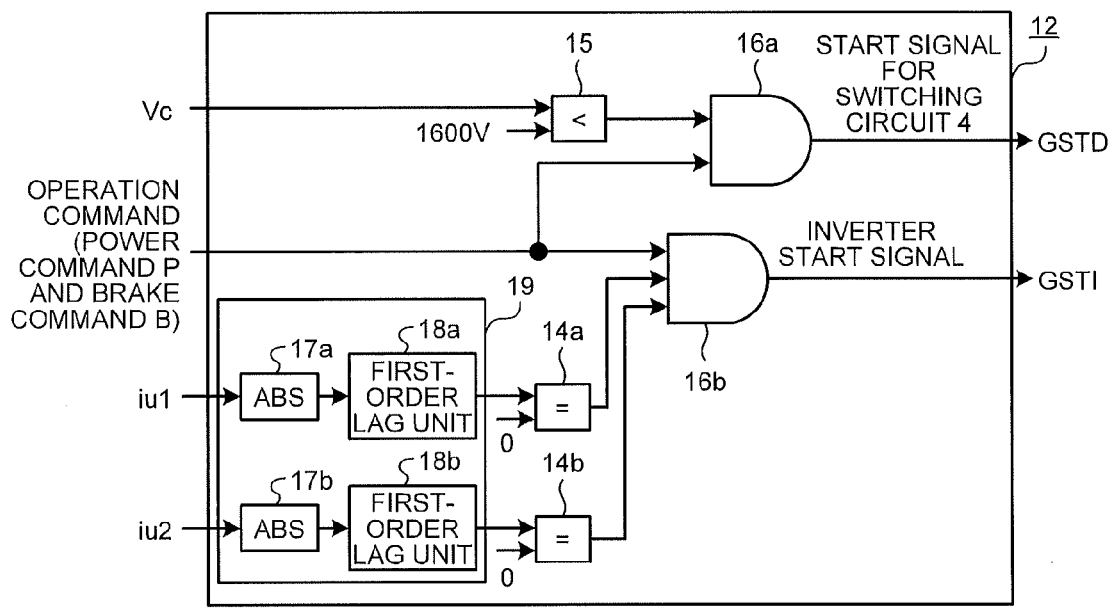
FIG. 4 is a configuration diagram of a switch-start instruction unit shown in FIG. 1.

FIG. 1 is a configuration diagram of a power conversion device according to a first embodiment of the present invention. FIG. 2 depicts a relation between a motor voltage of a synchronous machine and a no-load induction voltage. FIG. 3 is an explanatory diagram of an operation performed by the power conversion device shown in FIG. 1. FIG. 4 is a configuration diagram of a switch-start instruction unit shown in FIG. 1.

In FIG. 1, the power conversion device according to the present embodiment includes, as main constituent elements, a capacitor (first capacitor) 5 connected in parallel to a DC power supply 6, power converters 2a and 2b that drive two synchronous machines 1a and 1b, respectively, a capacitor (second capacitor) 3 connected in parallel to DC sides of the power converters 2, a switching circuit 4 connected in series between the capacitors 3 and 5, a voltage detector 8 that detects a voltage of the capacitor 3, a switch-start instruction unit (first control unit) 12, and control units (second control unit) 9a and 9b that control the power converters 2a and 2b, respectively.

The control units 9a and 9b are configured to include dq-axis current-command calculation units 10a and 10b and voltage-command calculation units 11a and 11b, respectively. The dq-axis current-command calculation units 10a and 10b calculate dq-axis current commands when velocity-information detectors 7a and 7b that detect velocities of the synchronous machines 1a and 1b input motor velocities (motor velocity information) ω1 and ω2 to the dq-axis current-command calculation units 10a and 10b, respectively. Each of the voltage-command calculation units 11a and 11b calculates a voltage command for controlling each of the power converters 2a and 2b based on dq-axis current commands id* and iq* calculated by the dq-axis current-command calculation unit 10a or 10b, the motor velocity ω1 or ω2, and a control signal from the switch-start instruction unit 12.

The switch-start instruction unit 12 generates a start signal GSTD for controlling the switching circuit 4 to be turned on or off and an inverter start signal GSTI for controlling the power converters 2a and 2b to start and stop operations based on an operation command that indicates a power command or a brake command, a current (current information) iu1 (hereinafter, simply "current iu2") detected by a current detector 13a, a current (current information) iu2 (hereinafter, simply "current iu2") detected by a current detector 13b, and a voltage (voltage information) Vc of the capacitor 3 detected by the voltage detector 8.

The switching circuit 4 is configured to include a switching element and a diode that is anti-parallel connected to the switching element. For example, when the synchronous machines 1a and 1b perform acceleration operations, the anti-parallel connected diode is made conductive in a direction of supplying power from the DC power supply 6 to the power converters 2.

Each of the power converters 2a and 2b is configured to include switching circuits Gu, Gv, Gw, Gx, Gy, and Gz. Specifically, each of the power converters 2a and 2b is constituted by a bridge circuit that includes three switching elements of a positive-side arm and three switching elements of a negative-side arm. Anti-parallel diodes are connected to the switching elements, respectively. Connection points between upper arm elements and lower arm elements in three phases constitute output terminals of the three phases, and a U-phase connection, a V-phase connection, and a W-phase connection are connected to the output terminals, respectively. The U-phase connection, the V-phase connection, and the W-phase connection are connected to each of the synchronous machines 1. By configuring the power converters 2a and 2b as described above, the switching elements operate to be turned on or off in response to gate signals from the control units 9a and 9b, thereby converting input DC voltages into three-phase alternating-current (AC) voltages at an arbitrary frequency and driving the synchronous machines 1, respectively.

As the synchronous machines 1a and 1b according to the first embodiment, permanent-magnet synchronous machines that generate magnetic fields by permanent magnets attached to rotators are used, respectively. The permanent-magnet synchronous machine generates an induction voltage in proportion to a product between a magnetic flux density and a rotational velocity of the synchronous machine 1 as characteristics of the single synchronous machine because a magnetic flux generated by the permanent magnet of the permanent-magnet synchronous machine is constant. This voltage is called "no-load induction voltage" and exhibits characteristics as indicated by a dotted line in FIG. 2. On the other hand, each of the power converters 2a and 2b generates a magnetic flux that cancels the magnetic flux generated by the permanent magnet by the use of an armature winding, that is, executes a so-called field-weakening control and performs an operation up to a high speed operation in a range in which the no-load induction voltage exceeds a maximum output voltage from each of the power converters 2a and 2b, because each of the power converters 2a, 2b is unable to generate a voltage equal to or larger than a DC voltage input from the DC power supply 6. An electric vehicle has an operation mode called "coasting" as described above. During such coasting, when the permanent-magnet synchronous machines are used, the no-load induction voltage is generated in the power conversion device. In the region in which this no-load induction voltage is higher than a DC voltage of each of the power converters 2a and 2b (corresponding to a voltage on both ends of the capacitor 5), the no-load induction voltage is full-wave rectified via the diodes anti-parallel connected to the respective switching circuits Gu, Gv, Gw, Gx, Gy, and Gz that constitute each of the power converters. Because the DC voltage rises, the full-wave-rectified power is regenerated toward the DC power supply 6 and a driving system performs a brake operation as a whole.

Furthermore, when the power conversion device operates so as to flow an excitation current for the field-weakening control while the electric vehicle is coasting, a copper loss generated by flowing a current to a winding of each permanent-magnet synchronous machine and a loss of each of the power converters 2a and 2b occur. Such a loss is unfavorable from the viewpoint of energy saving. The loss is a fatal problem particularly for the electric vehicle for which energy efficiency is the most important object.

Therefore, according to the first embodiment, the switching circuit 4 is inserted between the power converters 2a and 2b and the capacitor 5, and the synchronous machines 1a and 1b are driven via the power converters 2a and 2b, respectively, as shown in FIG. 1. In the first embodiment, the switching circuit 4 is configured to include the switching element such as an IGBT and a one-way conducting element such as the diode anti-parallel connected to the switching element. As this switching circuit 4, the same switching circuit as the switching circuits Gu, Gv, Gw, Gx, Gy, and Gz that constitute each of the power converters 2a and 2b can be used. This can reduce a manufacturing cost of main circuits.

The switching circuit 4 is turned on to supply the power from the DC power supply 6 to the power converters 2 when the power converters 2a and 2b perform the acceleration operations, for example.

When the power converters 2a and 2b stop operating and the no-load induction voltages generated by the synchronous machines 1a and 1b are higher than the voltage of the capacitor 3, then the switching element of the switching circuit 4 is turned off by the switch-start instruction unit 12 and the capacitor 3 is charged to peak. That is, during the "coasting", the no-load induction voltages from the synchronous machines 1a and 1b are full-wave rectified via the anti-parallel diodes that constitute the power converters 2a and 2b, and the capacitor 3 is charged with the rectified power. However, this capacitor 3 is instantly charged by appropriately selecting a capacity of the capacitor 3, thus preventing the system from performing the brake operation as a whole. Moreover, by appropriately selecting the capacity of the capacitor 3, the capacitor 3 is charged to the peak that is equal to a peak value of the no-load induction voltage of one of the synchronous machines 1a and 1b having a higher rotational frequency when the synchronous machines 1a and 1b rotate at different rotational frequencies.

When the switching element of the switching circuit 4 is turned off, the switching circuit 4 cuts off a flow of the power from the power converters 2a and 2b to the DC power supply 6. This can prevent generation of an unnecessary brake force that is possibly generated by regeneration of the no-load induction voltages generated in the synchronous machines 1a and 1b during the coasting and prevent the loss of the power accompanying the generation of the brake force. It is also possible to prevent a voltage of the DC power supply 6 from rising to be equal to or higher than a general power supply voltage.

As described above, the switch-start instruction unit 12 controls the switching circuit 4 and the power converters 2a and 2b to operate based on the operation command. For example, when the operation command is turned on (see a time t4 shown in FIG. 3) and the currents iu1 and iu2 are zero, the switch-start instruction unit 12 outputs an command for turning the power converters 2a and 2b into gate ON states, that is, for controlling, the power converters 2a and 2b to start operating and then controlling the switching circuit 4 to be turned on. That is, the switch-start instruction unit 12 turns on the inverter start signal GSTI and then turns on the start signal GSTD when the operation command is turned on and the currents iu1 and iu2 are zero.

When the operation command is turned off (see a time t1 shown in FIG. 3), the switch-start instruction unit 12 outputs a command for controlling the switching circuit 4 and the power converters 2 to stop operating simultaneously with turning off of the operation command. That is, the switch-start instruction unit 12 turns off the inverter start signal GSTI and the start signal GSTD when the operation command is turned off.

Particularly when the operation command is turned on (see the time t4 shown in FIG. 3), the inverter start signal GSTI output from the switch-start instruction unit 12 is turned on, and therefore it is necessary to instantly control voltages applied to the synchronous machines 1a and 1b. That is, it is necessary to control the dq-axis current command so as not to generate a brake torque that is possibly generated because a voltage applied to a motor exceeds a power supply voltage Vdc. In the power conversion device according to the present embodiment, the dq-axis current-command calculation units 10a and 10b of the control units 9a and 9b executes the control.

The control executed by the dq-axis current-command calculation units 10a and 10b right after the operation command is turned on is explained below.

A voltage equation of each permanent-magnet synchronous machine expressed on dq coordinates and a torque of the permanent-magnet synchronous machine are expressed by Equations (1) and (2), respectively.

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} 0 \\ \omega \cdot \phi_a \end{bmatrix} \quad (1)$$

$$T = P_n \cdot \phi_a \cdot i_q + P_n (L_d - L_q) \cdot i_d \cdot i_q \quad (2)$$

∴ id, iq: d-axis and q-axis components of armature current, and Vd, Vq: d-axis and q-axis components of armature voltage, $$\phi_a \sqrt{\frac{2}{3}} \phi_r,$$

$\phi_f$: Maximum value of armature flux linkage, R: Armature resistance, $L_d$, $L_Q$: d-axis and q-axis inductances, $$P = \frac{d}{dt_r},$$

$P_n$: Number of pole pairs, and ω: Armature angular velocity

A terminal voltage |Vm| that can be supplied to each permanent-magnet synchronous machine corresponds to an effective value of a line voltage, and is limited as expressed by an Equation (3) when the voltage of the capacitor 3 is Vc. The line voltage indicates a line voltage between one of U-phase and V-phase, V-phase and W-phase, and W-phase and U-phase of each of the synchronous machines 1a and 1b shown in FIG. 1.

$$|V_m| = \sqrt{v_d^2 + v_q^2} \leq \frac{Vc}{\sqrt{2}} \quad (3)$$

The relation expressed by an Equation (4) is held between a peak value Vmp of the line voltage and the voltage Vc of the capacitor 3.

$$Vmp = \sqrt{2} \times Vm = Vc \quad (4)$$

In high-voltage permanent-magnet synchronous machines, a d-axis current is passed so as to suppress the terminal voltage |Vm| within a DC bus voltage of each of the power converters 2a and 2b (the power supply voltage Vdc) in a high-speed area, and an equivalent field-weakening control is executed by the use of demagnetization function resulting from a d-axis armature reaction. During restart of the power converters 2a and 2b in the high speed area, it is necessary to start the power converters 2a and 2b by executing the field-weakening control right after the restart of the power converters 2a and 2b. Therefore, a d-axis current command is calculated using current limiting conditions of the Equation (3) shown above. To simplify the Equation (3), the voltage limiting conditions are transformed as expressed by an Inequality (5) and an Equation (6).

$$\sqrt{v_{d0}^2 + v_{q0}^2} \leq \frac{Vc}{\sqrt{2}} \quad (5)$$

However, $V_{d0}$ and $V_{q0}$ in the inequality (5) are obtained by ignoring a differential term in the equation (1). Furthermore, it is considered that ωL is sufficiently large because an area in which the power converters 2a and 2b are restarted by executing the field-weakening control is the high speed area. Therefore, an armature resistance drop in the equation (1) is also ignored and an Equation (6) is obtained.

$$\begin{bmatrix} v_{d0} \\ v_{q0} \end{bmatrix} = \begin{bmatrix} 0 & -\omega L_q \\ \omega L_d & 0 \end{bmatrix} \begin{bmatrix} i_d \\ i_q \end{bmatrix} + \begin{bmatrix} 0 \\ \omega \cdot \phi_a \end{bmatrix} \quad (6)$$

Based on the Inequality (5) and the Equation (6), the conditions for the d-axis current used in the field-weakening control are expressed by an Equation (7).

$$i_d = \frac{\phi_a}{L_d} + \frac{1}{L_d}\sqrt{\left(\frac{\frac{Vc}{\sqrt{2}}}{\omega^2}\right)^2 - (L_d \cdot i_q)^2} \quad (7)$$

It suffices to set iq=0 according to the Equation (2) shown above so as not to generate the torque during the restart of the power converters 2a and 2b. Therefore, when iq=0 is assigned to the Equation (7), and $i_d$ is expressed by an Equation (8). In the Equation (8), it is defined as follows. Ld, Lq: d-axis and q-axis inductances, respectively, φa=√3/2*φf, and φf: Maximum value of armature flux linkage by the permanent magnet.

$$i_d = \frac{\phi_a}{L_d} + \frac{1}{L_d}\frac{\frac{Vc}{\sqrt{2}}}{\omega^2} \quad (8)$$

That is, the line voltage can be suppressed to be equal to or lower than the voltage Vc of the capacitor 3 by preventing the generation of the torque during the restart of the power converters 2 according to the Equation (8). Therefore, the voltage-command calculation unit 11a calculates the d-axis current command id* that enables the voltage Vc of the capacitor 3 and the line voltage of the synchronous machine 1 to be instantly set to be equal to or lower than a desired value (1600 volts, for example) based on the voltage Vc of the capacitor 3 and the motor velocities ω1 and ω2 according to the Equation (8). That is, id in the Equation (7) is replaced by id*.

The iq*=0, the id* calculated by the use of the Equation (8), the motor velocities ω1 and ω2 detected by the velocity-information detectors 7a and 7b, respectively, and the voltage Vc of the capacitor 3 are input to the voltage-command calculation units 11a and 11b according to the present embodiment. As it is well known, a control coordinate axis is necessary when coordinate-transforming a three-phase voltage or three-phase current into two orthogonal axes of rotation. The voltage-command calculation units 11a and 11b calculate a phase θ of the control coordinate axis that is each of the two orthogonal axes of rotation based on the arbitrary motor velocities ω1 and ω2, respectively. This phase θ can be obtained by integrating the motor velocity ω1 or ω2 as shown in an Equation (9).

$$\theta = \int \omega \cdot dt \quad (9)$$

The voltage-command calculation units 11a and 11b calculate dq-axis voltage commands Vd* and Vq* according to an Equation (10), respectively. By setting the iq*=0, it is possible to prevent the generation of the torque.

$$\begin{bmatrix} v_d^* \\ v_q^* \end{bmatrix} = \begin{bmatrix} R^* & -\omega \cdot L_q^* \\ \omega \cdot L_d^* & R^* \end{bmatrix} \begin{bmatrix} i_d^* \\ i_q^* \end{bmatrix} + \begin{bmatrix} 0 \\ \omega \cdot \phi_a^* \end{bmatrix} \quad (10)$$

Each of the voltage-command calculation units 11a and 11b calculates a voltage phase θv of a three-phase voltage command according to an Equation (11). That is, each of the voltage-command calculation units 11a and 11b calculates the voltage phase θv of the three-phase voltage command by adding a phase angle of each of the dq-axis voltage commands Vd* and Vq* to the phase angle θ.

$$\theta_v = \theta + \tan^{-1}\left(\frac{v_d^*}{v_q^*}\right) \quad (11)$$

Each of the voltage-command calculation units 11a and 11b calculates a modulation factor PMF based on the voltage Vc of the capacitor 3 according to an Equation (12).

$$PMF = \frac{\sqrt{(v_d^*)^2 + (v_q^*)^2}}{\frac{\sqrt{6}}{\pi} V_C} \qquad (12)$$

Each of the voltage-command calculation units 11a and 11b calculates a U-phase voltage command Vu*, a V-phase voltage command Vv*, and a W-phase voltage command Vw* as expressed by an Equation (13) by using values of the Equations (9), (11), and (12).

$$\begin{bmatrix} v_u^* \\ v_v^* \\ v_w^* \end{bmatrix} = PMF \times \begin{bmatrix} \cos\theta_v \\ \cos\left(\theta_v - \frac{2}{3}\pi\right) \\ \cos\left(\theta_v - \frac{4}{3}\pi\right) \end{bmatrix} \qquad (13)$$

The voltage-command calculation units 11a and 11b calculate the gate signals based on the three-phase voltage commands Vu*, Vv*, and Vw*, and output the gate signals to the power converters 2a and 2b so that the power converters 2a and 2b can execute pulse width controls, respectively.

The power conversion device according to the present embodiment can suppress the unnecessary torque generated by the excess of the line voltage over the power supply voltage Vdc because the line voltage is limited to the desired value (1600 volts) that does not exceed the power supply voltage Vdc even when the operation command is turned on during the coasting.

A configuration of the switch-start instruction unit 12 that is one of characteristic elements of the power conversion device according to the present embodiment is explained below.

With reference to FIG. 4, the voltage Vc of the capacitor 3, the operation command, the current iu1, and the current iu2 are input to the switch-start instruction unit 12, and the switch-start instruction unit 12 outputs the start signal GSTD in response to the voltage Vc of the capacitor 3 and the operation command, and outputs the inverter start signal GSTI in response to the operation command and the currents iu1 and iu2.

The switch-start instruction unit 12 is configured to include, as main constituent elements, a comparison unit 15, an AND unit 16a, a current-effective-value calculation unit 19, equal comparison units 14a and 14b, and an AND unit 16b. Furthermore, the current-effective-value calculation unit 19 is configured to include absolute-value processing units (ABS) 17a and 17b, and first-order lag units 18a and 18b.

The voltage Vc of the capacitor 3 is input to the comparison unit 15. The comparison unit 15 compares the voltage Vc of the capacitor 3 with the predetermined value (1600 volts as described above), and outputs "1" when the voltage Vc of the capacitor 3 is lower than the predetermined value and outputs "0" otherwise. The AND unit 16a loads the output from the comparison unit 15 and the operation command, and outputs the start signal GSDT "1" for turning on the switching circuit 4 when the output value from the comparison unit 15 is "1" and the operation command is "1" (turned on). Furthermore, the AND unit 16a outputs the start signal GSTD "0" for turning off the switching circuit 4 when the operation command is "0" (turned off).

The current iu1 is input to the absolute-value processing unit 17a, and the absolute-value processing unit 17a performs an absolute value process on the current iu1. The first-order lag unit 18a loads an absolute value of the current iu1 output from the absolute-value processing unit 17a, and calculates an effective value of the current iu1 (a DC amount) by a filter effect resulting from a first order lag. The current iu2 is input to the absolute-value processing unit 17b, and the absolute-value processing unit 17b performs an absolute value process on the current iu2. The first-order lag unit 18b loads an absolute value of the current iu2 output from the absolute-value processing unit 17b, and calculates an effective value of the current iu2 (a DC amount) by the filter effect resulting from the first order lag. The equal comparison unit 14a compares the effective value of the current iu1 output from the first-order lag unit 18a with a threshold "0", and outputs "1" indicating that the effective value of the current iu1 is equal to the threshold "0" when the effective value of the current iu1 is "0", and outputs "1" indicating that the effective value of the current iu1 is greater than the threshold "0" when the effective value of the current iu1 is other than "0". Similarly, the equal comparison unit 14b compares the effective value of the current iu2 output from the first-order lag unit 18b with the threshold "0", and outputs "1" indicating that the effective value of the current iu2 is equal to the threshold "0" when the effective value of the current iu2 is "0", and outputs "1" indicating that the effective value of the current iu2 is greater than the threshold "0" when the effective value of the current iu2 is other than "0".

The operation command, an output signal from the equal comparison unit 14a, and an output signal from the equal comparison unit 14b are input to the AND unit 16b. The AND unit 16b outputs "1" indicating an approval to start the power converters 2 as the inverter start signal GSTI that is turned on when all of these values are "1" (turned on for the operation command). Further, the AND unit 16b outputs "0" indicating a disapproval to start the power converters 2 when all of those signals are not "1".

Main operations performed by the power conversion device according to the present embodiment are described with reference to FIG. 3. The main operations are described while assuming that a state up to the time t1 is a state where the break command is output, a state from a time t2 to the time t4 is a coasting state, and a state after the time t4 is a state where the power command is output in FIG. 3 by way of example. Moreover, (a) shown in FIG. 3 represents an ON or OFF state of the operation command, (b) represents an ON or OFF state of the start signal GSTD, and (c) and (d) represent ON or OFF states of the inverter start signals GSTI. Sign (e) denotes ON or OFF states of a voltage Efc1 of the capacitor 5, the voltage Vc of the capacitor 3, a peak value Vmp1a of the line voltage of the synchronous machine 1a, and a peak value Vmp1b of the line voltage of the synchronous machine 1b. Sign (f) denotes a state of the current iu1 and (g) denotes a state of the current iu2.

At the time t1, when the operation command (a) is turned off, the start signal GSTD (b) from the AND unit 16a is turned off and the switching circuit 4 is, therefore, turned off. In addition, when the operation command (a) is turned off, the inverter start signals GSTI (c) and (d) from the AND unit 16b are turned off and the power converters 2a and 2b turn into gate OFF states. The currents iu1 (f) and iu2 (g) up to the time t1 are regenerated toward a side of the power supply voltage Vdc and become negative.

From the times t1 to t2, both the no-load induction voltage of the synchronous machine 1a and that of the synchronous machine 1b during the coasting rise by the coasting. However, when the power converters 2a and 2b turn into gate OFF states, the no-load induction voltage of the synchronous machine 1a differs in magnitude from that of the synchronous machine 1b as denoted by (e) because of a difference in motor frequency between the synchronous machines 1a and 1b. FIG. 3 depicts a case where the motor frequency of the synchronous machine 1a is higher than that of the synchronous machine 1b as an example. The no-load induction voltage of the synchronous machine 1b peaks at the time t2 whereas that of the synchronous machine 1a peaks at the time t3. Accordingly, the peak value Vmp1a of the line voltage of the voltage synchronous machine 1a becomes a no-load induction voltage, and the voltage Vc of the capacitor 3 rises to follow an increase in this no-load induction voltage. The peak value Vmp1b of the line voltage of the synchronous machine 1b is lower than the voltage Vc of the capacitor 3.

Moreover, from the times t1 to t2, the currents iu1 (f) and iu2 (g) continue flowing by the increase in the no-load induction voltage. From the times t2 to t3, the current iu1 (f) continues flowing. When the power converters 2a and 2b start operating while the currents iu1 and iu2 flow by such coasting, high motor currents flow to the power converters 2a and 2b. Accordingly, the power converters 2a and 2b possibly malfunction by an overcurrent.

The switch-start instruction unit 12 according to the present embodiment is configured to control the power converters 2a and 2b to turn into the gate OFF states while the currents iu1 and iu2 flow by the coasting. Therefore, the currents iu1 and iu2 during the coasting can prevent the power converters 2a and 2b from malfunctioning. The voltage Efc1 of the capacitor 5 does not rise because the switching circuit 4 is turned off as denoted by (e) shown in FIG. 3.

Next, at the time t4, when the operation command (a) is turned on, the inverter start signals GSTI (c) and (d) from the AND unit 16b are turned on and the power converters 2a and 2b, therefore, turn into gate ON states. The voltage Vc of the capacitor 3 and the line voltages of the synchronous machines 1 instantly fall to the desired value (1600 volts) in response to the start of the operations performed by the power converters 2a and 2b. When the voltage Vc of the capacitor 3 and the line voltages of the synchronous machines 1 are equal to or lower than the desired value (1600 volts) (that is, at a moment of a time t5), the start signal GSTD (b) from the AND unit 16a is turned on. As a result, the power supply 6 is connected to the power converters 2a and 2b, whereby it is possible for the synchronous machines 1a and 1b to perform acceleration and deceleration operations.

When the operation command (a) is turned off to start the coasting, the switch-start instruction unit 12 controls the switching circuit 4 to be turned off and controls the capacitor 3 to absorb energy corresponding to the no-load induction voltages of the synchronous machines 1a and 1b. As denoted by (e) shown in FIG. 3, the peak value Vmp1a of the line voltage of the synchronous machine 1a balances the voltage Vc of the capacitor 3.

The capacity of the capacitor 3 that is the characteristic of the present invention can be determined as follows.

For example, when the no-load induction voltage of each of the synchronous machines 1 is a maximum of 1800 volts and an initial voltage of the capacitor 3 right after the coasting is 1500 volts, a voltage increment of the capacitor 3 is 300 volts.

The voltage increment of the capacitor 3 can be expressed by an Equation (14) based on the relation with a current idc flowing into the capacitor 3. The capacity of the capacitor 3 is denoted by C. The relation between a potential of the capacitor 3 and a direction in which the current idc flows is represented by arrows shown in FIG. 1.

$$300 = \frac{1}{C}\int_0^\tau (-idc)dt \tag{14}$$

The current idc flowing into the capacitor 3 can be expressed by an Equation (15) according to the Equation (14).

$$idc = -C \cdot \frac{300}{dt} \tag{15}$$

It is defined that an average torque generated when the no-load induction voltages of the synchronous machines 1 balance the voltage Vc of the capacitor 3 is denoted by T, the energy resulting from the torque T is denoted by P, and that a rotational angle frequency is denoted by $\omega$ (a mechanical angle), the energy P can be expressed by an Equation (16).

$$P = T \times \omega \tag{16}$$

Furthermore, the energy P can be expressed by an Equation (17) based on the relation between the voltage Vc of the capacitor 3 and the current idc flowing into the capacitor 3.

$$P = Vc \times idc \tag{17}$$

According to the Equations (15) to (17), the torque T generated when the no-load induction voltages of the synchronous machines 1 balance the voltage Vc of the capacitor 3 can be expressed by an Equation (18).

$$T = \frac{Vc \times idc}{\omega} = -C \cdot \frac{300}{dt} \times \frac{Vc}{\omega} \tag{18}$$

According to the Equation (18), the capacity C of the capacitor 3 can be expressed by an Equation (19).

$$C = \frac{T \times \omega \times dt}{300 \times Vc} \tag{19}$$

The capacity C of the capacitor 3 can be determined by assigning the following values to respective parameters in an Equation (19). The specific capacity C of the capacitor 3 is considered by using typical constants for an electric vehicle. For example, it is assumed that $\omega = 270 \times (2\pi/3)$ [rad/sec] and Vc=1800 [V]. Furthermore, T is considered to be the generated torque that is permissible for dt=0.1 [sec], and it is assumed that T is −0.1 [Nm] or smaller, and that time is dt=0.1 [sec]. By assigning the above parameters to the Equation (19), the capacity C of the capacitor 3 can be expressed by an Equation (20).

$$C = \frac{0.1 \times 270 \times 2\pi/3 \times 0.1}{300 \times 1800} \geq 10.471 \times 10^{-6} [F] \tag{20}$$

Based on the above assumptions, it is understood that it suffices that the capacity C of the capacitor 3 shown in FIG. 1 is equal to or larger than 10.47 microfarad. The capacity of the capacitor 5 is about 1500 microfarad to 3000 microfarad for the electric vehicle.

In this way, the present inventor has found out that the capacity C of the capacitor 3 suffices to be small as compared with that of the capacitor 5. For example, it suffices that the capacity C of the capacitor 3 is equal to or larger than one-hundredth of the capacity of the capacitor 5 and equal to or smaller than one-tenth of the capacity of the capacitor 5. That is, the present inventor has found out that the following relation is held for the capacity C of the capacitor 3.

(Capacity of capacitor 5)×1/100≤(Capacity of capacitor 3)≤(Capacity of capacitor 5)×1/10

The power conversion device can be downsized by setting the capacity C of the capacitor 3 to be equal to or smaller than the one-tenth of the capacity of the capacitor 5.

As described above, the power conversion device according to the present embodiment includes the switch-start instruction unit 12 that controls the switching circuit 4 to be turned off while each of the power converters 2 stops, that outputs the signal for controlling each of the power converter 2 to start operating when the operation command is turned on, and that controls the switching circuit 4 to be turned on when the value of the terminal voltage of each of the synchronous machines 1 is equal to or smaller than the predetermined value. Accordingly, even when the operation command is turned on in situations where the no-load induction voltages of a plurality of the synchronous machines 1a and 1b differ in magnitude, it is possible to change the operation from the coasting to the acceleration and deceleration operation without generating the brake operation.

The switch-start instruction unit 12 is configured to output the signal (the inverter start signal GSTI in the OFF state) for controlling each of the power converters 2 to stop operating in a state where the operation command is turned off and where the current flows between the synchronous machine 1 and the power converter 2. Accordingly, each of the power converters 2 turns into the gate OFF state while the currents iu1 and iu2 flow by the coasting. As a result, it is possible to prevent each of the power converters 2 from malfunctioning by an overcurrent.

Furthermore, according to the present embodiment, the capacitor 3 that is connected between the power converters 2 and the switching circuit 4 is downsized. Therefore, it is possible to provide a power conversion device that can drive a plurality of synchronous machines and that is small and light in weight as compared with conventional power conversion devices.

Second Embodiment

Figure 5:
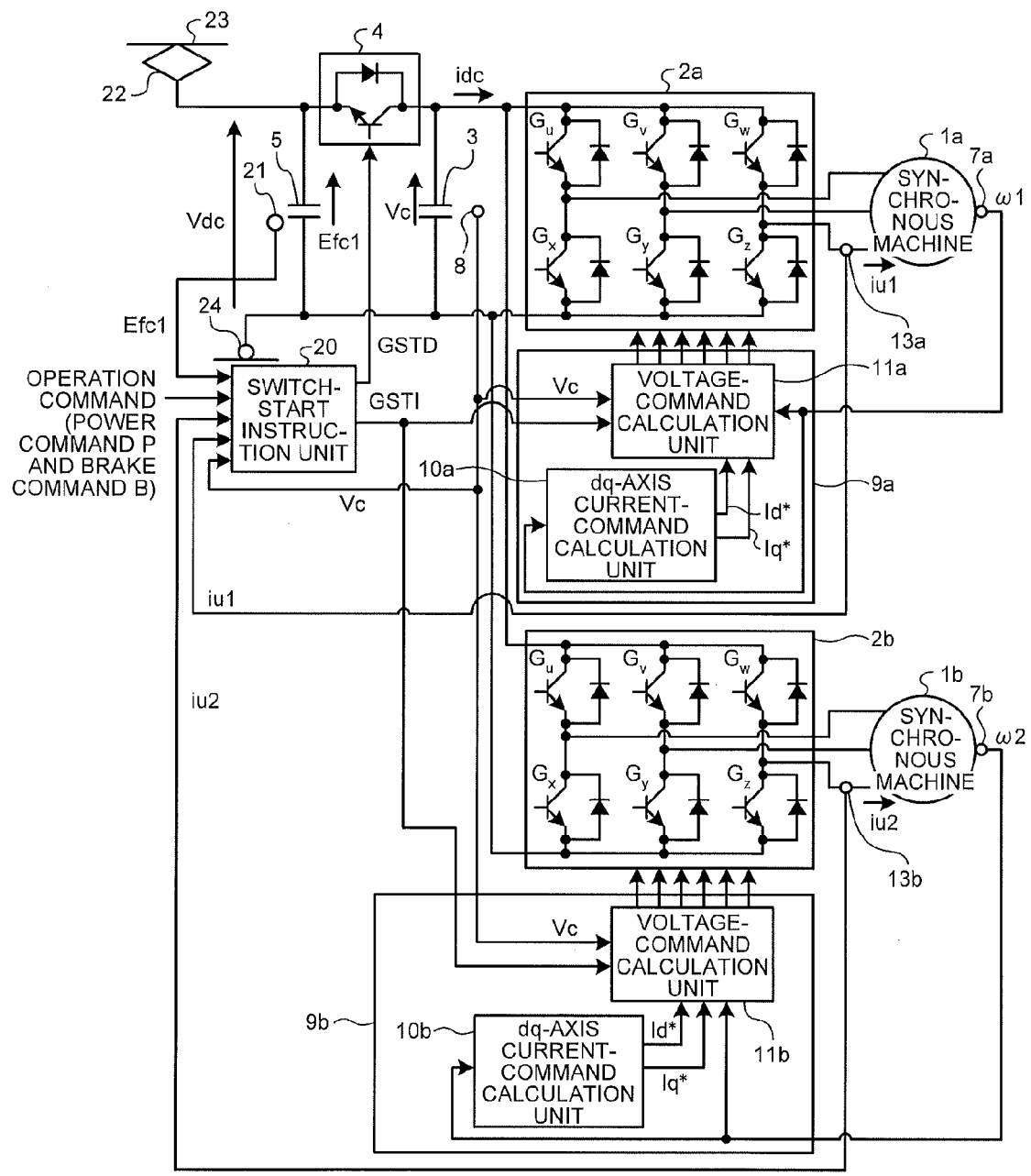
FIG. 5 is a configuration diagram of a power conversion device according to a second embodiment of the present invention.
Figure 6:
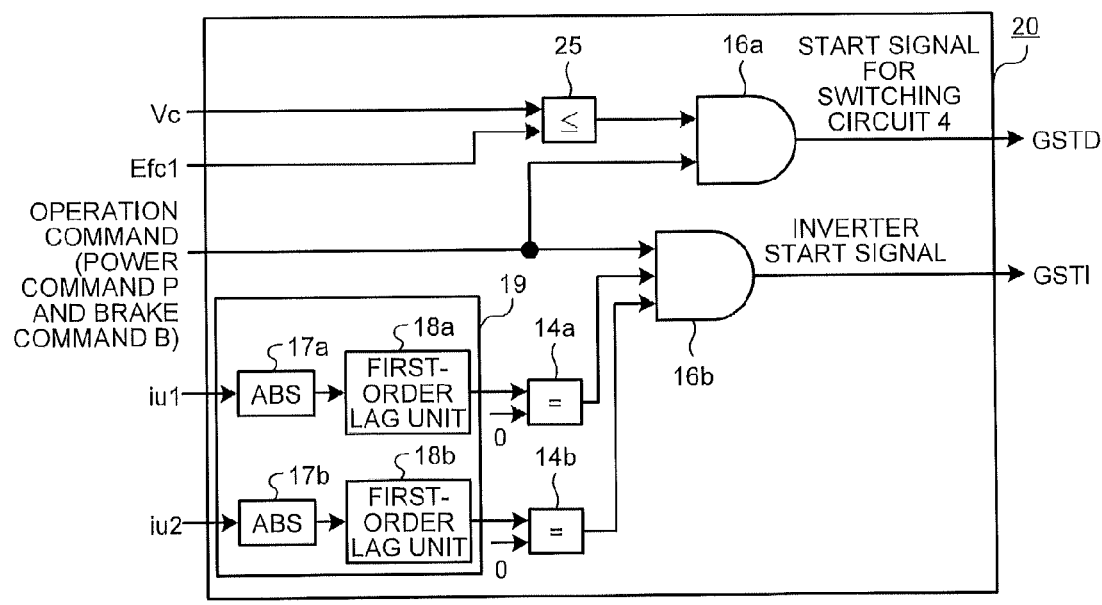
FIG. 6 is a configuration diagram of a switch-start instruction unit shown in FIG. 5.
Figure 7:
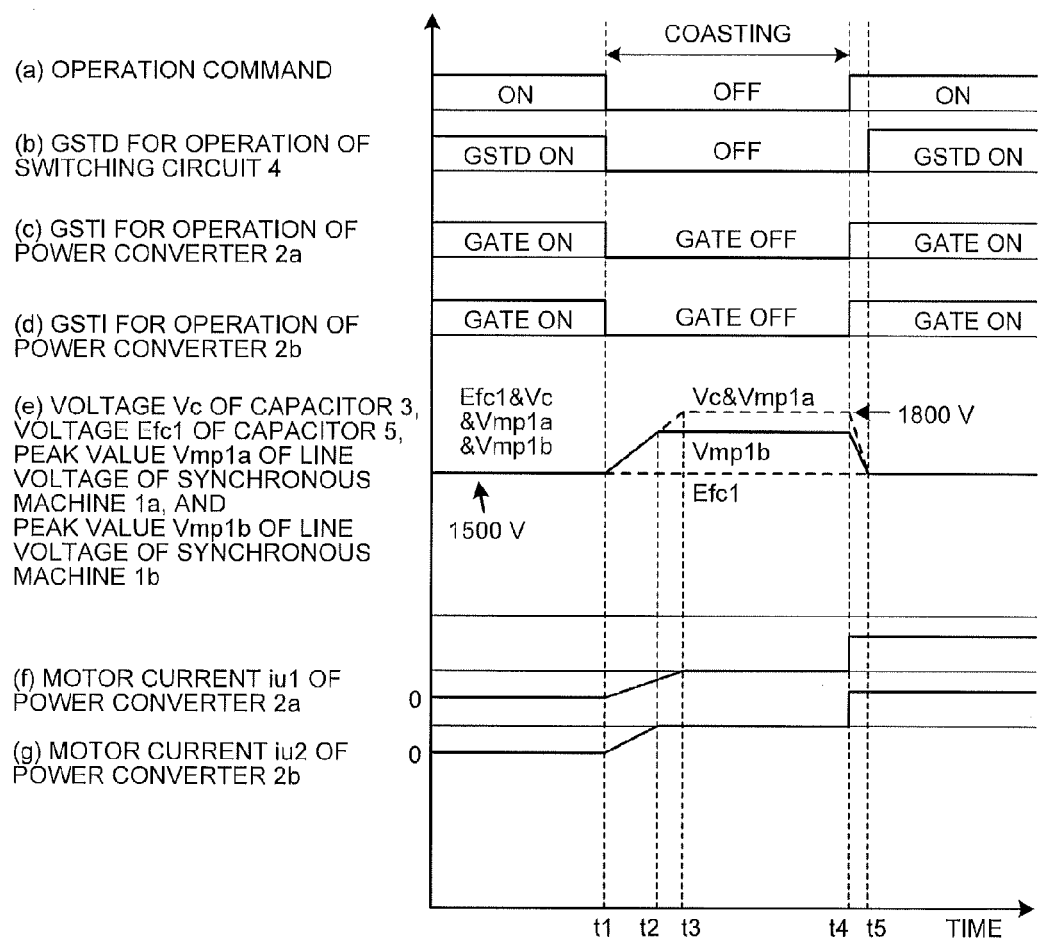
FIG. 7 is an explanatory diagram of an operation performed by the power conversion device shown in FIG. 5.

FIG. 5 is a configuration diagram of a power conversion device according to a second embodiment of the present invention. FIG. 6 is a configuration diagram of a switch-start instruction unit shown in FIG. 5. FIG. 7 is an explanatory diagram of an operation performed by the power conversion device shown in FIG. 5. In the following descriptions, constituent elements identical to those described in the first embodiment are denoted by like reference signs and redundant explanations thereof will be omitted, and only elements different from those of the first embodiment are described.

With reference to FIG. 5, the power conversion device for an electric vehicle according to the second embodiment is configured to include, as main constituent elements, the capacitor (first capacitor) 5 connected in parallel to the DC power supply, the power converters 2a and 2b that drive the two synchronous machines 1a and 1b, respectively, the capacitor (second capacitor) 3 connected to the DC sides of the power converters 2, the switching circuit 4 connected in series between the capacitors 3 and 5, the voltage detector 8 that detects the voltage of the capacitor 3, a voltage detector 21 that detects the voltage Efc1 of the capacitor 5, a switch-start instruction unit (first control unit) 20, and the control units (second control unit) 9a and 9b that control the power converters 2a and 2b, respectively. The power conversion device according to the second embodiment differs from that according to the first embodiment in a configuration of the switch-start instruction unit and such that the voltage detector 21 is provided. The voltage Efc1 of the capacitor 5 detected by the voltage detector 21 is input to the switch-start instruction unit 20. A current from an electric power substation (not shown) is input to the power converters 2a and 2b from an aerial line 23 via a pantograph 22, and returned to the electric power substation via a wheel 24 through the power converters 2a and 2b.

The DC voltage (Vdc) supplied to a train from the aerial line 23 via the pantograph 22 repeatedly rises and falls under various conditions. Therefore, the power conversion device incorporated in the train is required to be able to handle a fluctuation in the DC voltage. The power conversion device according to the present embodiment is configured to be able to handle the aerial line via which such a fluctuating DC voltage is applied.

A configuration of the switch-start instruction unit 20 is described below with reference to FIG. 6. The switch-start instruction unit 20 is configured to include a comparison unit 25, the AND unit 16a, the current-effective-value calculation unit 19, the equal comparison units 14a and 14b, and the AND unit 16b.

The voltage Vc of the capacitor 3 and the voltage Efc1 of the capacitor 5 are input to the comparison unit 25. The comparison unit 25 compares the voltage Vc of the capacitor 3 with the voltage Efc1 of the capacitor 5, and outputs "1" when the voltage Vc of the capacitor 3 is lower than the voltage Efc1 of the capacitor 5 and outputs "0" otherwise. The AND unit 16a loads the output from the comparison unit 25 and the operation command, and outputs the start signal GSDT "1" for turning on the switching circuit 4 when the output value from the comparison unit 25 is "1" and the operation command is "1" (turned on). Furthermore, the AND unit 16a outputs the start signal GSTD "0" for turning off the switching circuit 4 when the operation command is "0" (turned off).

When the voltage Vc of the capacitor 3 is higher than the voltage Efc1 of the capacitor 5, the output from the comparison unit 25 is "0" and the start signal GSTD for the switching circuit 4 changes from "1" to "0". The switching circuit 4 is, therefore, turned off. With this configuration, an unnecessary regenerative current does not flow through the aerial line 23, and it is advantageously possible to prevent generation of the unnecessary regenerative current. The current-effective-value calculation unit 19, the equal comparison units 14a and 14b, and the AND unit 16b are identical in configuration to those according to the first embodiment and explanations thereof will be omitted.

Operations performed by the power conversion device according to the present embodiment are explained with reference to FIG. 7. The second embodiment is identical in operations to the first embodiment from the times t1 to t4 shown in FIG. 7. At the time t4, when the operation command (a) is turned on, the inverter start signals GSTI (c) and (d) from the AND unit 16b are turned on, and the power converters 2a and 2b, therefore, turn into the gate ON states. The power converters 2a and 2b start operating, whereby the voltage Vc of the capacitor 3 and the line voltages of the synchronous machines 1 instantly fall to be equal to the voltage Efc1 of the capacitor 5. When the voltage Vc of the capacitor 3 and the line voltages of the synchronous machines 1 are equal to or lower than the voltage Efc1 of the capacitor 5 (that is, at the moment of the time t5), the start signal GSTD (b) output from the AND unit 16a is turned on.

As described above, the power conversion device according to the present embodiment includes the switch-start instruction unit 20 that controls the switching circuit 4 to be turned off while each of the power converters 2 stops, that outputs the signal for controlling each of the power converters 2 to start operating when the operation command is turned on, and that controls the switching circuit 4 to be turned on when the value of the voltage Vc of the capacitor 3 is equal to or smaller than the value of the voltage Efc1 of the capacitor 5. Accordingly, even if the operation command is turned on in situations where the voltage Efc1 of the capacitor 5 fluctuates, it is possible to change the operation from the coasting to the acceleration and deceleration operation without generating the brake operation.

The switch-start instruction unit 20 is configured to control each of the power converters 2 not to start operating in a state where the current flows between each of the synchronous machines 1 and each of the power converters 2. Accordingly, each of the power converters 2 turns into the gate OFF state while the currents iu1 and iu2 flow by the coasting. As a result, it is possible to prevent each of the power converters 2 from malfunctioning by an overcurrent.

Furthermore, according to the present embodiment, the capacitor 3 is downsized similarly to the first embodiment. Therefore, it is possible to provide a power conversion device that can drive a plurality of synchronous machines and that is small and light in weight as compared with conventional power conversion devices.

The power conversion device according to the first and second embodiment is configured to drive two synchronous machines; however, the present invention is not limited thereto, and for example, the power conversion device can be configured to drive three or more synchronous machines.

The power conversion device according to the first and second embodiment is only an example of the contents of the present invention, and it can be combined with other publicly known techniques, and it is needless to mention that a modification such as omitting a part of its configuration can be made without departing from the scope of the present invention.

INDUSTRIAL APPLICABILITY

As described above, the present invention can be applied to a power conversion device that drives a plurality of synchronous machines, and particularly suitable as an invention that can suppress a brake operation caused by no-load induction voltages generated by a plurality of synchronous machines.

REFERENCE SIGNS LIST 1a, 1b SYNCHRONOUS MACHINE
2a, 2b POWER CONVERTER
3 CAPACITOR (SECOND CAPACITOR)
4 SWITCHING CIRCUIT
5 CAPACITOR (FIRST CAPACITOR)
6 DC POWER SUPPLY
7a, 7b VELOCITY-INFORMATION DETECTOR
8 VOLTAGE DETECTOR
9a, 9b CONTROL UNIT (SECOND CONTROL UNIT)
10a, 10b dq-AXIS CURRENT-COMMAND CALCULATION UNIT
11a, 11b VOLTAGE-COMMAND CALCULATION UNIT
12, 20 SWITCH-START INSTRUCTION UNIT (FIRST CONTROL UNIT)
13a, 13b CURRENT DETECTOR
14a, 14b EQUAL COMPARISON UNIT
15, 25 COMPARISON UNIT
16a, 16b AND UNIT
17a, 17b ABSOLUTE-VALUE PROCESSING UNIT
18a, 18b FIRST-ORDER LAG UNIT
19 CURRENT-EFFECTIVE-VALUE CALCULATION UNIT
21 VOLTAGE DETECTOR
22 PANTOGRAPH
23 AERIAL LINE
24 WHEEL
Efc1 VOLTAGE OF CAPACITOR 5
GSTD START SIGNAL
GSTI INVERTER START SIGNAL
idc CURRENT FLOWING INTO CAPACITOR 3
id* d-AXIS CURRENT COMMAND
iq* q-AXIS CURRENT COMMAND
iu1 CURRENT FLOWING INTO POWER CONVERTER 2a
iu2 CURRENT FLOWING INTO POWER CONVERTER 2b
Vc VOLTAGE OF CAPACITOR 3
Vmp1a PEAK VALUE OF LINE VOLTAGE OF SYNCHRONOUS MACHINE 1a
Vmp1b PEAK VALUE OF LINE VOLTAGE OF SYNCHRONOUS MACHINE 1b
Vd* d-AXIS VOLTAGE COMMAND
Vq* q-AXIS VOLTAGE COMMAND
Vdc DC VOLTAGE
$\omega 1, \omega 2$ MOTOR VELOCITY

The invention claimed is:

1. A power conversion device comprising:
a first capacitor connected in parallel to a direct-current power supply that supplies power to a plurality of synchronous machines;
a plurality of power converters configured to drive each of the synchronous machines;
a second capacitor connected in parallel to a direct-current side of the power converters;
a switching circuit connected in series between the first capacitor and the second capacitor;
a voltage detector configured to detect a voltage of the first capacitor;
a first control unit configured to control operations of each of the power converters and the switching circuit based on an operation command, voltage information detected in the second capacitor, and current information detected in each of the synchronous machines; and
a second control unit configured to control each of the power converters based on the voltage information, motor velocity information detected in each of the synchronous machines, and a control signal from the first control unit, wherein
the first control unit is further configured to:
control the switching circuit to be turned off and each of the power converters to be turned off, in response to the operation command being turned off;
output a signal for starting an operation of each of the power converters, in response to receiving the operation command;
control the switching circuit to be turned on in response to a value of the voltage information becoming equal to or smaller than a predetermined value; and control the switching circuit to be turned off while each of the power converters is turned off, output a signal for starting an operation of each of the power converters when the operation command is turned on, and control the switching circuit to be turned on when a value of the voltage information detected in the first capacitor has become equal to or smaller than a value of the voltage information detected in the second capacitor.

2. The power conversion device according to claim 1, wherein the first control unit is configured to output a signal for stopping an operation of each of the power converters in response to the operation command being turned off.

3. The power conversion device according to claim 1, wherein the switching circuit is equivalent to a switching circuit that constitutes the power converters.

4. The power conversion device according to claim 1, wherein a capacity of the second capacitor is equal to or larger than one-hundredth of a capacity of the first capacitor and equal to or smaller than one-tenth of the capacity of the first capacitor.

5. The power conversion device according to claim 1, wherein the first control unit is applied to a railway vehicle.

* * * * *